United States Patent [19]

Menschig et al.

[11] Patent Number: 6,080,957
[45] Date of Patent: Jun. 27, 2000

[54] MICROMECHANICAL TOOL

[75] Inventors: Arnd Menschig, Weil im Schoenbuch; Juergen Staud, Oggenhausen, both of Germany

[73] Assignee: Deutsche Forschungsanstalt Fuer Luft-und Raumfahrt e.V., Bonn, Germany

[21] Appl. No.: 08/932,073

[22] Filed: Sep. 17, 1997

[30] Foreign Application Priority Data

Sep. 17, 1996 [DE] Germany ............................ 196 37 822

[51] Int. Cl.[7] .................................................. B23K 26/00
[52] U.S. Cl. ................. 219/121.67; 137/884; 219/121.6; 269/21
[58] Field of Search ........................... 219/121.6, 121.67; 356/375; 137/884; 269/21; 418/187

[56] References Cited

U.S. PATENT DOCUMENTS

| 4,088,312 | 5/1978 | Frosch et al. .............................. 269/21 |
| 4,474,544 | 10/1984 | White, Jr. ................................. 418/187 |
| 5,184,647 | 2/1993 | Goedecke et al. ....................... 137/884 |
| 5,222,524 | 6/1993 | Sekler et al. ............................. 137/884 |
| 5,324,155 | 6/1994 | Goodwin et al. . |
| 5,622,170 | 4/1997 | Schulz ..................................... 356/375 |
| 5,640,995 | 6/1997 | Packard et al. .......................... 137/884 |
| 5,831,734 | 11/1998 | Van Tooren et al. ................... 356/375 |

FOREIGN PATENT DOCUMENTS

| 0 114 505 | 8/1984 | European Pat. Off. . |
| 33 10 593 | 10/1983 | Germany . |
| 40 01 937 | 7/1991 | Germany . |
| 42 19 042 | 10/1993 | Germany . |
| 2 078 668 | 1/1982 | United Kingdom . |
| WO 91/13470 | 9/1991 | WIPO . |

Primary Examiner—Geoffrey S. Evans
Attorney, Agent, or Firm—Barry R. Lipsitz; Ralph F. Hoppin

[57] ABSTRACT

A micromechanical tool includes at least one functional module. The functional module has a housing which is constructed as a layer package consisting of structured, flat material elements forming several layers of the layer package. In one embodiment the functional embodiment positions a first end of a light conductor with respect to an object. It is also conceivable for the function module to be a machining module by irradiating for the purpose of altering the material by laser radiation.

31 Claims, 7 Drawing Sheets

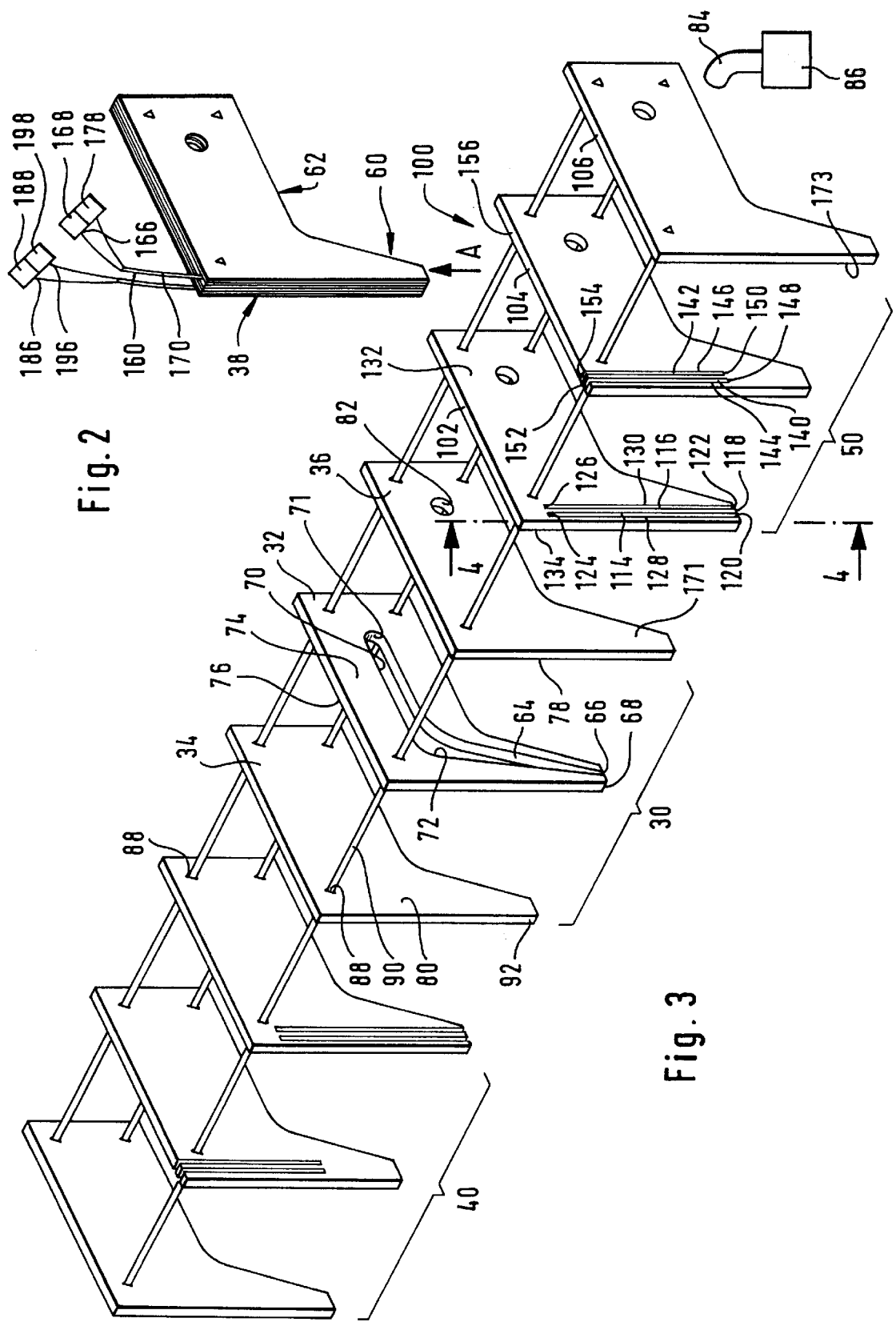

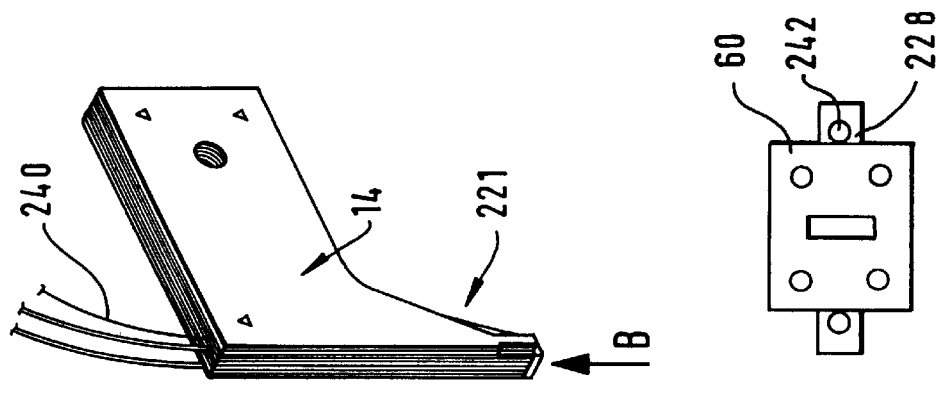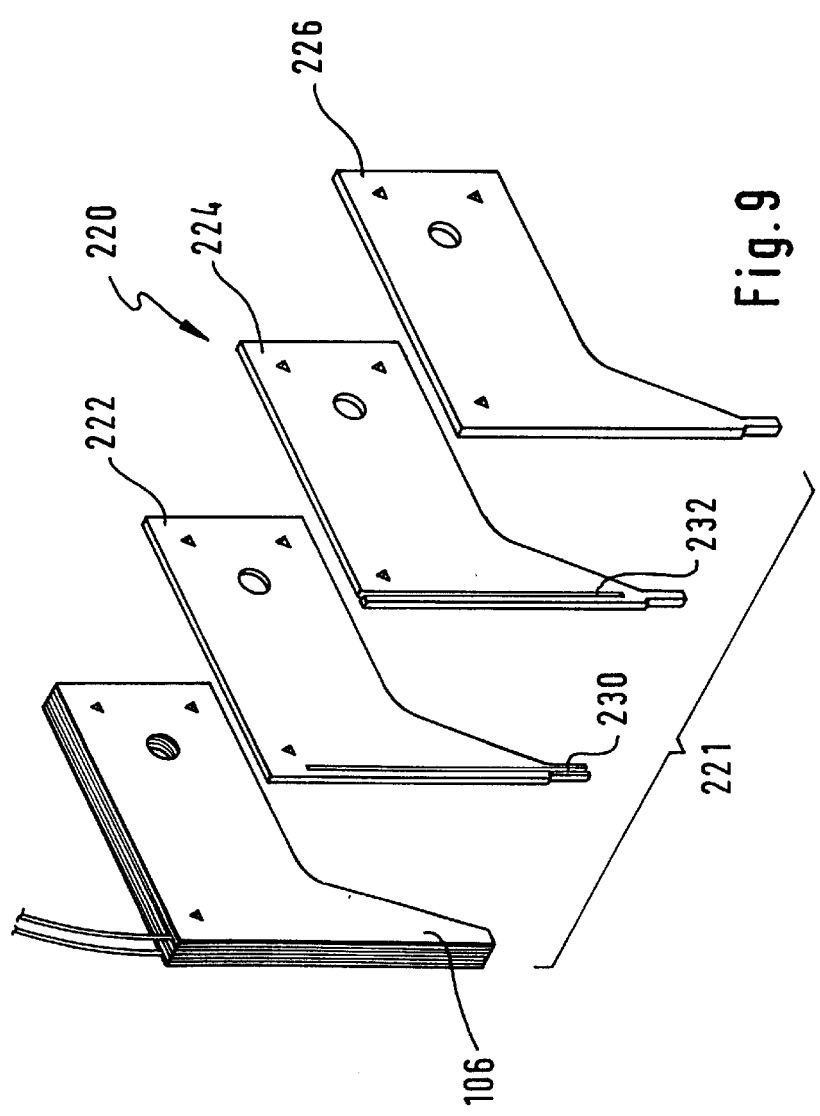

MICROMECHANICAL TOOL

BACKGROUND OF THE INVENTION

The invention relates to a micromechanical tool comprising at least one function module.

Micromechanical tools have so far been designed as tools produced especially for the individual case and have therefore been of an extremely complicated construction.

SUMMARY OF THE INVENTION

The object underlying the invention is therefore to create a micromechanical tool which is of as simple a construction as possible and can therefore be produced as simply as possible.

This object is accomplished in accordance with the invention, in a micromechanical tool of the type described at the outset, in that the function module has a housing which is constructed as a layer package consisting of structured, flat material elements forming several layers of the layer package.

The advantage of the inventive solution is to be seen in the fact that the individual flat material elements can be produced extremely simply and inexpensively and thus different function modules can also be produced inexpensively in accordance with the same basic principle.

In this respect, it is particularly expedient when each flat material element is structured such that it forms an integrally coherent part. In this case, the assembly of the housing consisting of several layers does not pose any problems whatsoever since each layer is represented by an integrally coherent flat material element and only the individual flat material elements need to be positioned exactly in relation to one another.

The structure of the flat material elements could, in principle, be optional. For example, it would be conceivable to provide recesses or similar structures in the flat material elements.

For reasons of the simplicity of the construction of the inventive function module, it is particularly expedient when the flat material elements are structured exclusively by means of edge surfaces extending over the thickness of the flat material. This means that the structure of the flat material elements can be achieved only by creating edge surfaces which extend over the entire thickness of the flat material elements, wherein these edge surfaces can be produced by sawing, cutting or other, shaping processes. The advantage consists in the fact that the edge surfaces always penetrate the entire thickness and thus the shaping procedure is particularly simple.

One expedient solution provides for the housing to have an operating tip adapted to a workpiece, wherein an adaptation is possible, in particular, with respect to the size of the workpiece but also with respect to its shape. This means that an accuracy of the work is possible which is not known from the state of the art.

It is particularly favourable when the operating tip has a dimension on the workpiece side which is in the order of magnitude of a dimension or the dimensions of the workpiece.

The functional design of the housing can be brought about in the most different of ways. For example, it is conceivable to predetermine functions by means of electrically conductive and electrically non-conductive flat material elements in a suitable combination. It is particularly expedient when the housing comprises a flat material element having a function-determining channel since the channel can be formed particularly easily in the respective flat material.

The channel can, for example, serve to supply or remove media or also as a receiving means for light conductors or for machining tips.

In order to cover the channel, it is preferably provided for the channel to be located between flat material elements covering it.

The channel could, for example, likewise extend only over part of the thickness of the flat material element. It is, however, particularly expedient when the channel is formed by a passage penetrating the flat material element.

In order to ensure, nevertheless, that the flat material element is an integrally coherent part, it is preferably provided for the passage to be open in the region of a narrow side of the flat material element and to have a closed end located in the interior of the flat material element so that the passage has a sack-like shape which allows the flat material element having the passage to be constructed in an undivided and integral manner.

In order to be able to supply a medium to such a channel, for example, an access opening is preferably provided in a flat material element covering the channel, this access opening being arranged to overlap with the channel and creating the possibility of adapting this opening with respect to its size to a supply line for the purpose of sealingly connecting it.

In order to be able to provide a channel in the housing with passages designed in this manner, with the channel extending through this housing, i.e. being accessible from two sides, it is preferably provided for the channel to be formed by two flat material elements, each of which has a passage, and for the two passages to overlap one another. This means that it is possible to have access to the channel via one of the flat material elements from a narrow side thereof and then, again, have an opening in a narrow side of the other flat material element available via the channel in the other flat material element.

In this respect, it is particularly favourable when the passages overlap in an area located near to the inner end and extend in different directions proceeding from this area so that a channel extending from a narrow side of one flat material element to another narrow side of a flat material element located next to it can be produced.

In order to align the individual flat material elements in a defined manner relative to one another for the production of the layer package, it is preferably provided for the flat material elements to be provided with aligning elements. The aligning elements can be all types of markings, preferably for optical adjustment, or also all types of shaped members which preferably interact in a form-locking manner, in particular, for the purpose of alignment.

An advantageous solution provides for the aligning elements to comprise recesses.

The individual flat material elements can preferably be aligned relative to one another particularly favourably when the aligning elements of all the flat material elements are arranged so as to be aligned with one another in a direction extending transversely to the flat material elements.

The alignment of the flat material elements can be brought about particularly advantageously during the formation of the layer package when the flat material elements can be positioned relative to one another by means of aligning rods engaging in a form-locking manner in the recesses.

With regard to the connection of the individual flat material elements with one another for creating the layer package, no further details have so far been given. For example, a particularly advantageous embodiment provides for the flat material elements of a function module to be connected to one another by joining. Such joining provides, for example, for bonding or soldering or welding. It is, however, also conceivable to form a flat material element itself from a material such that a joining connection of the flat material elements abutting thereon can be provided by means of this material. For example, the material of the flat material element is a meltable material.

In principle, the flat material elements can have different thicknesses. In order to simplify the production of the inventive function module, in particular, to an especially large extent it is provided for all the flat material elements of a function module to be produced from a flat material having the same thickness.

Furthermore, a particularly favourable structuring process for the flat material elements provides for these to be produced by cutting out from a piece of flat material or stamping or molding.

With respect to the type of function modules, no further details have so far been given. One advantageous embodiment provides, for example, for the function module to be a position detection module of a positioning system. In this respect, several position detection modules arranged on the tool are advantageous, in particular, in order to facilitate an exact detection of all the coordinates or also a relative position of two parts in relation to one another.

Alternatively or in addition thereto, it is conceivable for the function module to be a handling module for a workpiece, wherein all types of handling are conceivable. A particularly favourable form of handling provides for the function module to be designed as a gripper module, in particular as a suction gripper module, with which the workpiece is gripped by means of suction.

Alternatively thereto, it is, however, also conceivable for the function module to be a machining module, wherein machining is also to be understood as joining, irradiating for the purpose of altering the material, for example with laser radiation, or also any type of material removal. One embodiment of such a machining module provides for this to be in a position to apply laser light in a defined manner, wherein, in this case, it is possible, preferably with a light conductor located in a channel of the housing, to supply laser light to a machining process in a defined manner.

A particularly advantageous, inventive tool comprises several function modules so that several functions can be carried out at the same time or one after the other with the same tool.

In addition, the invention relates to a positioning system for the alignment of tools relative to an object, in particular in microcircuitry. Such a positioning system is not known from the state of the art. Up to now, it has always been assumed that the measurement of the position and, in particular, the measurement of the precision positioning of the tool is also carried out via the device for moving the tool.

Such a positioning is, in many cases, either not exact enough or extremely complicated.

In the inventive positioning system it is, therefore, provided for this to comprise two markings arranged at a distance from one another and stationary with respect to the object and at least two position detection modules on the tool side and for each position detection module to have a housing for a first end of a light conductor detecting one of the markings, the second end of this light conductor being guided to an optical detector, and for the housings to be positioned at such a distance from one another that each light conductor detects one of the markings. With such a positioning system it is possible to position the tool itself immediately in a defined and exact manner.

The inventive positioning system is constructed particularly expediently when the position detection modules are arranged on both sides of a central module, wherein the central module is, in many cases, likewise a function module of the tool and, in particular, the central module also undertakes a tool function itself. This means that a particularly exact positioning of the tool is possible.

It is expedient, in particular, for the exact positioning with the inventive positioning system when the first ends of the light conductors are arranged in the region of an operating tip of a tool so that the distance to the actual tool function is as slight as possible.

In order to define the distance between the first ends of the light conductors accommodated in the housings of the position detection modules in an exact manner, it is provided for this distance to be defined by means of the central module arranged between the housings, i.e. its extension in the direction of the spacing.

This results in a particularly simple possibility of integrating the positioning system into the tool itself.

The provision of several positioning systems for one tool is particularly advantageous, whereby not only the position of the tool relative to a part but also the position of the tool relative to a receiving means or a carrier, on which the part is intended to be placed, can be determined exactly.

A particularly advantageous solution provides for each position detection module to be designed in accordance with the features of an inventive function module. This creates the possibility of constructing a tool from different function modules in accordance with the inventive principle, wherein one function module provides, for example, the tool function whereas a different function module serves for position detection. Alternatively or in addition thereto, it is, however, also possible to design a function module as a distance detection module.

This means that not only the tool function but also the function of position detection can be realized with a tool which is designed, altogether, of several layers of a layer package, wherein the individual layers of the layer package form different function modules and different housings.

Additional features and advantages of the inventive solution are the subject matter of the following description as well as the drawings illustrating some embodiments.

BRIEF DESCRIPTION OF THE DRAWINGS

FIG. 2 shows an overall illustration of an inventive tool as layer package;

FIG. 3 shows an exploded illustration of the inventive tool;

FIG. 8 shows an inventive tool according to FIG. 2 with additional distance measuring module;

FIG. 9 shows an exploded illustration of the distance measuring module of the tool according to FIG. 8;

FIG. 10 shows a plan view of the tool according to FIG. 8 in the direction of arrow B and FIG. 11 shows a schematic illustration of a distance measurement by means of the distance measuring module according to FIG. 9.

DETAILED DESCRIPTION OF THE INVENTION

Figure 1:
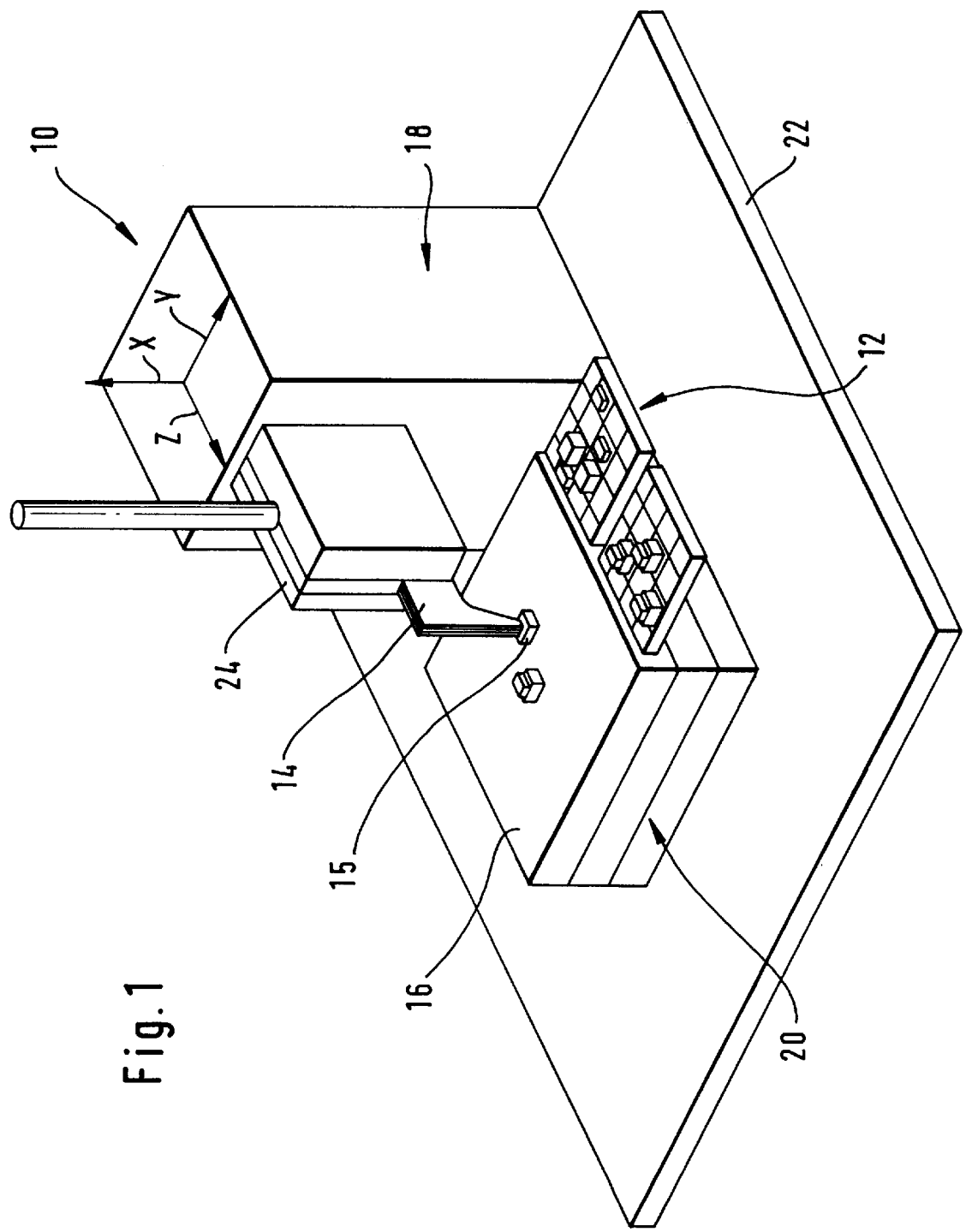
FIG. 1 shows a schematic illustration of an inventive tool inserted in a micromechanical operating device.

An embodiment of a micromechanical operating device designated as a whole as 10 comprises, as illustrated in FIG. 1, a positioning device designated as a whole as 12, with which a tool 14 can be positioned relative to a working surface 16 for the handling of workpieces 15. The positioning device 12 is constructed, for example, of a linear movement device 18 for carrying out linear movements along the axes X, Y and Z and a rotary table 20 which are both seated on a base plate 22, wherein the tool 14 is held on the linear movement device 18 with a tool holder 24 whereas the working surface 16 is arranged on the rotary table 20.

In addition, it is possible to provide precision positioning means in the area of the rotary table.

An example of an inventively constructed tool, illustrated in FIG. 2 as a whole and in FIG. 3 in an exploded illustration, comprises a gripper module as first function module 30 as well as additional function modules 40 and 50 on both sides of the gripper module 30, these both representing position detection modules.

The gripper module 30 comprises a housing 38 constructed as a layer package from a total of three flat material elements 32, 34 and 36, wherein all three flat material elements 32, 34 and 36 together form an operating tip 60 which extends from a module member 62.

The flat material element 32 of the gripper module 30 which is designed to determine the function comprises a channel 64 which opens into an opening 66 which, for its part, is located in a front narrow side 68 of the operating tip 60 facing the working surface 16. The channel 64 extends through the area of the flat material element 32 located in the operating tip 60 as far as the area located in the module member 62 and there forms a chamber 70 which extends as far as an end wall 71 of the channel 64 so that the channel 64 as a whole is designed like a sack and is not accessible from any other narrow side of the flat material element 32 other than from the narrow side 68.

Furthermore, the channel 64 does, however, represent a passage through the entire flat material element 32 which penetrates the entire thickness of the flat material element and extends with channel walls 72 from one flat side 74 to the other flat side 76 of the flat material element 32.

In order to close the channel 64 in the planes of the flat sides 74 and 76, the flat material elements 34 and 36 are provided which act as covers and abut on the flat sides 74 and 76 with their flat sides 78 and 80 facing the flat material element 32. In this respect, the flat material element 34 closes the channel 64 in the plane of the flat side 76 completely while the flat material element 36 has a passage 82 which opens into the chamber 70 near the end wall 71 of the channel 64 and creates the possibility of obtaining additional access to the channel 64 via this passage 82 in addition to the opening 66.

In the illustrated embodiment of the gripper module 30, this is a suction gripping means which is in a position to draw in a workpiece with the opening 66. For this purpose, the channel 64 is connected via the passage 82 and a suction line 84 to a suction device 86 which draws a medium, for example air, through the channel 64 and thus the opening 66 thereof for the purpose of holding the workpiece.

The individual flat material elements 32, 34 and 36 of the gripper module 30 are connected to one another by joining, for example adhesion or soldering or bonding, wherein in addition to the defined alignment thereof each flat material element is provided with two or three aligning openings 88, through which an aligning rod 90 can be guided for the purpose of alignment for the joining.

In the inventive embodiment, all the flat material elements 32, 34 and 36 are of an identical design with respect to their outer structure determined by their outer edges 92 and so they can be joined together to form a layer package with a constant outer contour.

The two position detection modules 40 and 50 are of an identical but mirror-inverted design and each comprise, as likewise illustrated in FIG. 3 in the case of the position detection module 50, a housing 100 with two function-determining flat material elements 102 and 104 which are located between two flat material elements serving as cover, wherein the function-determining flat material elements 102 and 104 are located between an outer, covering flat material element 106 and the respective outer, covering flat material element 36 or 34 of the gripper module 30.

The function-determining flat material element 102 comprises two channels 114 and 116 which are of a sack-like design and extend parallel to one another and which have openings 120 and 122, respectively, arranged in a front narrow side 118 located in the area of the operating tip 60 and facing the working surface 16. The channels 114 and 116 extend from these openings through the area of the operating tip 60 in the direction of the module member 62 as far as an end wall 124, 126 and thereby have channel walls 128 and 130, respectively, which extend over the thickness of the flat material element 102 from one flat side 132 to the other flat side 134 thereof so that the channels 114 and 116 also penetrate the entire flat material element 102.

An additional access to the channels 114 and 116 is provided via the flat material element 104 which likewise has two channels 140 and 142 of a sack-like design which penetrate the flat material element 104 with their channel walls 144 and 146 and have, on the one hand, end walls 148, 150 as well as, on the other hand, openings 152, 154 which are located in the area of the module member 62, for example in a narrow side 156 of the flat material element 104 facing away from the operating tip 60. In addition, the channels 140 and 142 extend such that they are parallel to the channels 114 and 116 at least in their end regions located close to the end walls 148 and 150 and are arranged congruently to them. This means that an access to the channels 114 and 116 is possible in the flat material element 102 via the openings 152 and 154 of the channels 140 and 142 in the flat material element 104.

Figure 4:
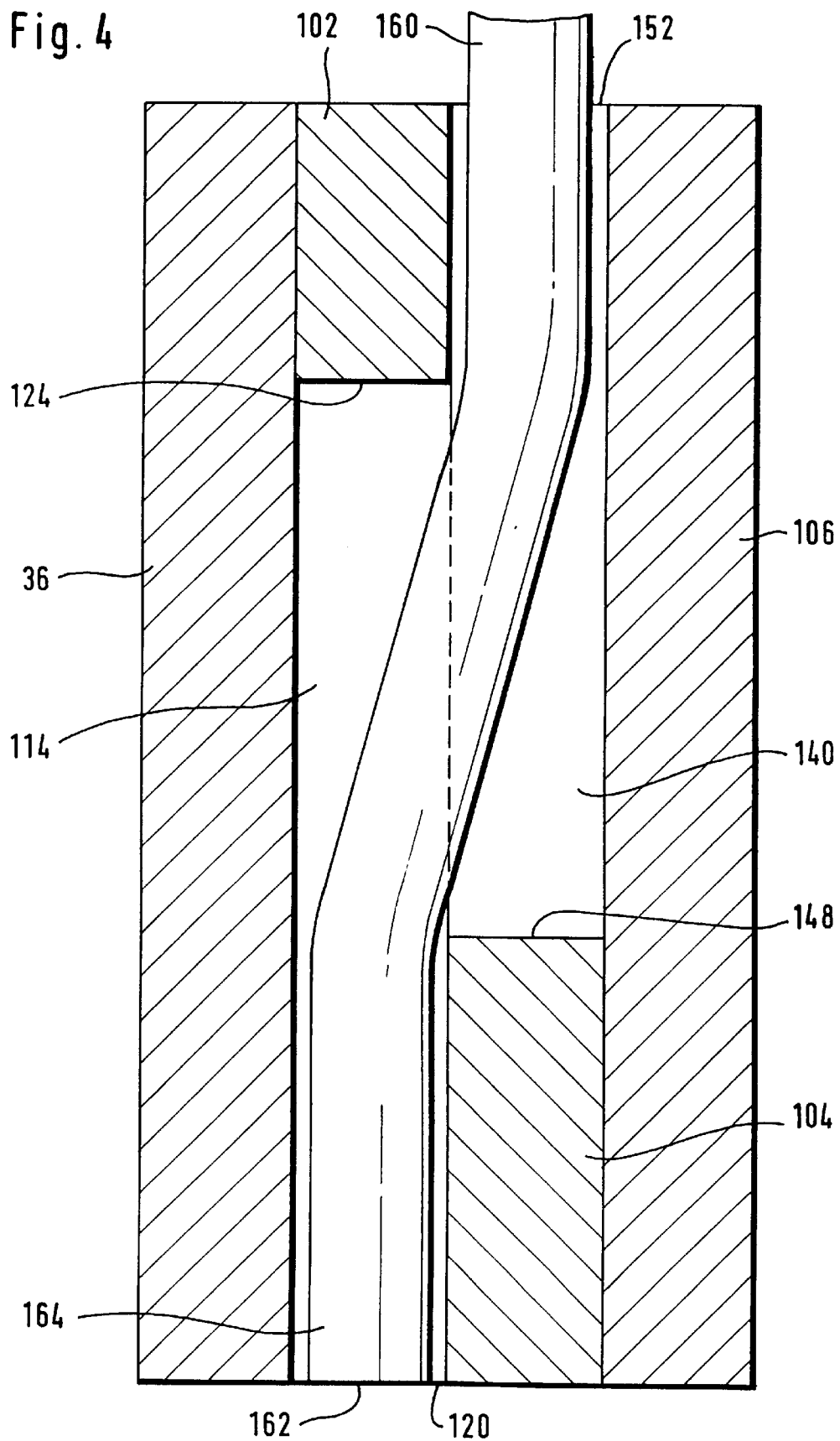
FIG. 4 shows a partial section through a position detection module along line 4—4 in FIG. 3.

The channels 114 and 116 or 140 and 142 serve, as illustrated in FIG. 4 with the example of the channels 114 and 140, to accommodate light conductors 160 which are first of all introduced into the channel 140 via the openings, for example the opening 152, and then guided from the channel 140 into the channel 114, wherein a first end 162 of the light conductor 160 is arranged such that this is located in the area of the opening 120 of the channel 114 and is thus in a position to couple in incoming light through the opening 120 or allow emerging light to exit from the end 162 through the opening 120, as well.

Since the channel 114 is closed by a flat side 171 of the flat material element 36 and the channel 140 by a flat side 173 of the flat material element 106, the two channels 114 and 140 form a receiving means for an end region 164 of the light conductor 160 located close to the end 162, the light conductor, as illustrated in FIG. 2, being guided to a detector 168 with a second end 166.

Figure 5:
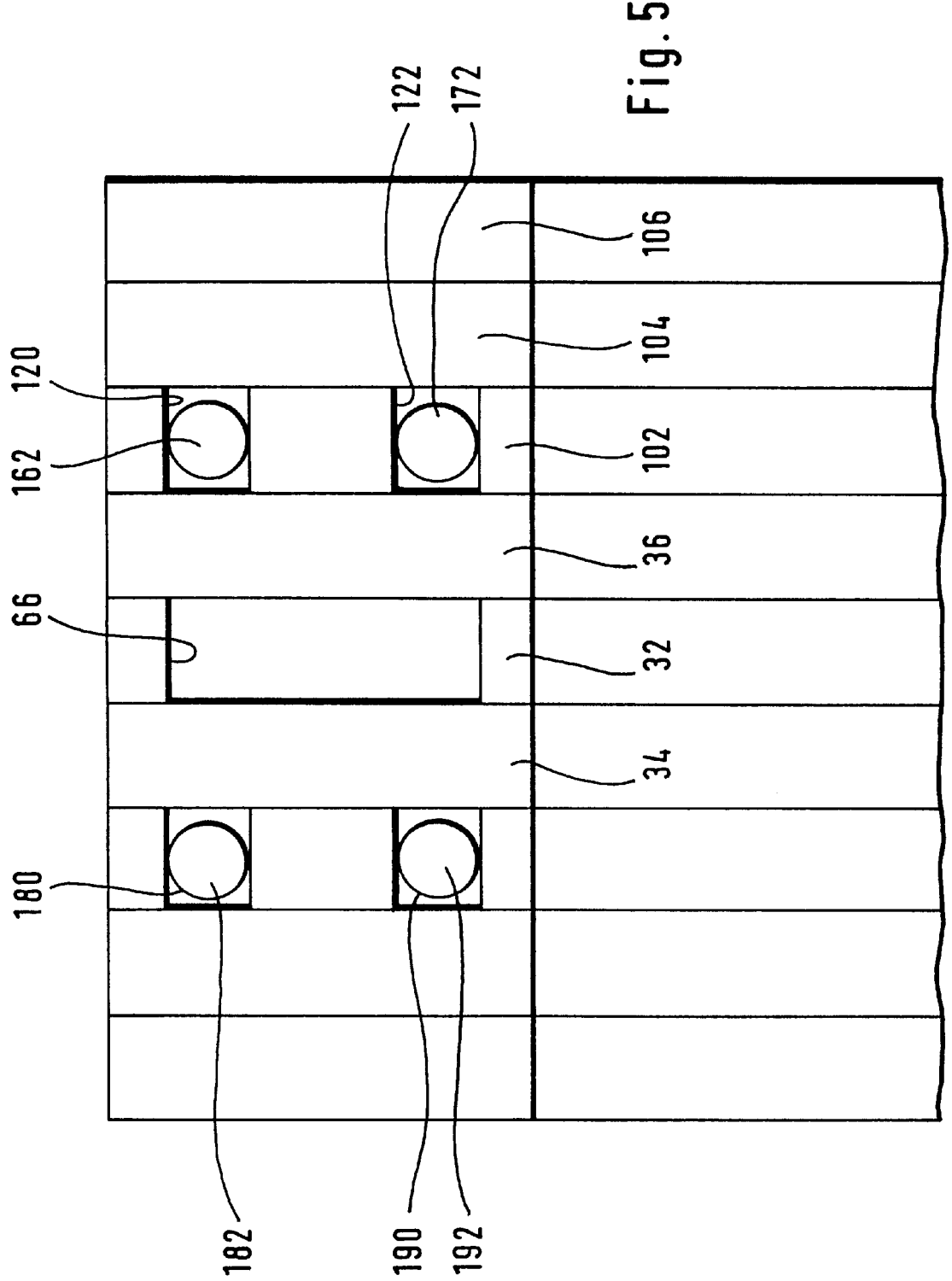
FIG. 5 shows a plan view of the inventive tool in the direction of arrow A in FIG. 2.

In the same way as the channels 114 and 140, the channels 116 and 142 also serve as a receiving means for a light conductor 170 which is likewise guided to a detector 178 and located with a first end 172 in the area of the opening 122, as illustrated in FIG. 5.

The position detection module 40 is also designed in the same way as the position detection module 50 and so ends 182 and 192 of light conductors 180 and 190 are located laterally next to the opening 66 while second ends 186 and 196 of the light conductors are connected to detectors 188 and 198 (FIGS. 2 and 5).

Figure 6:
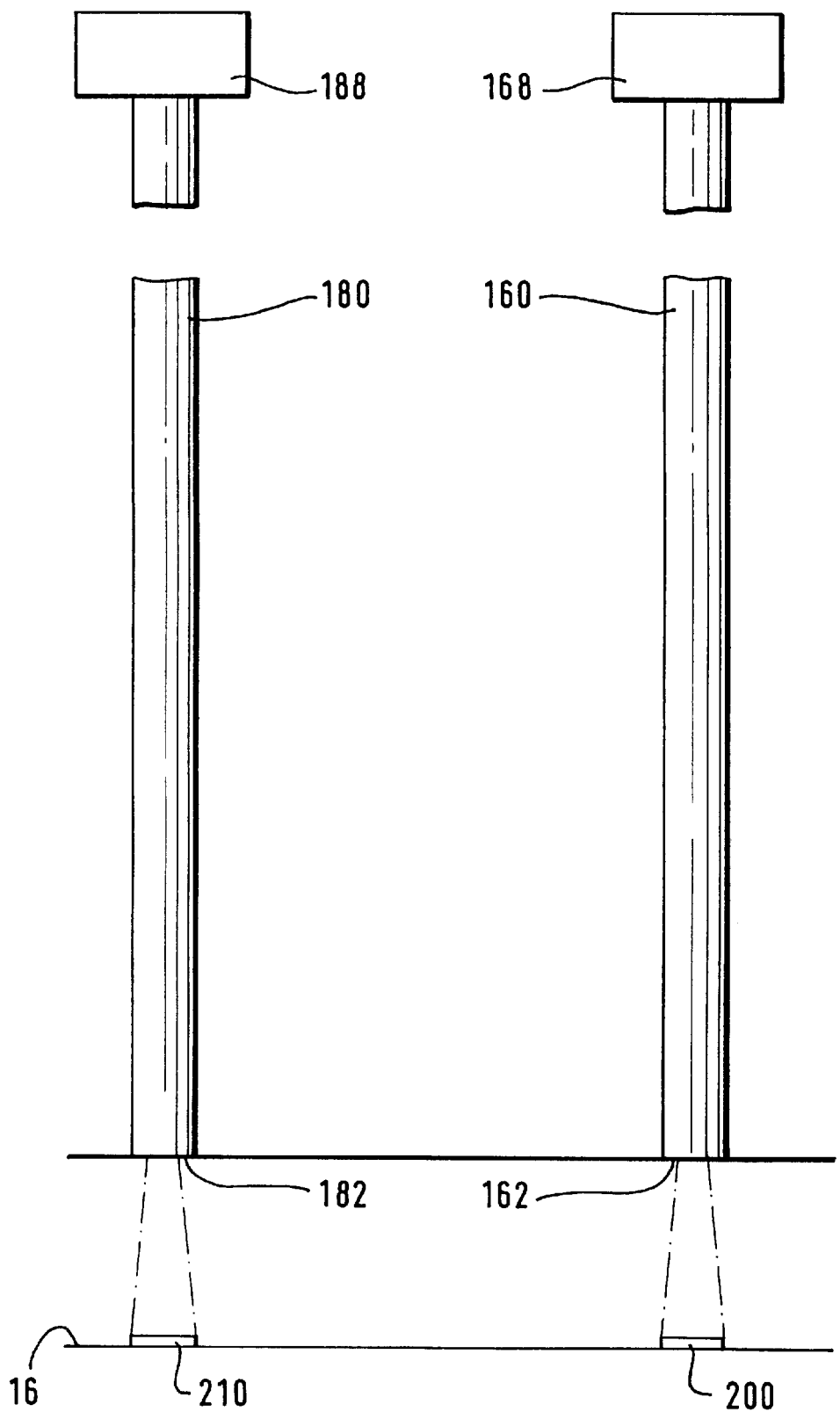
FIG. 6 shows a schematic illustration of the arrangement of light conductors relative to one another in an inventive positioning system.

For the exact position detection, as illustrated in FIG. 6 with the example of the light conductors 160 and 180, each light conductor optically images on the respective detector 168 and 188 a position marking 200 and 210, respectively, which is arranged on the working surface 16 and provided for this light conductor, wherein the respective detector is, for example, a detector for detecting the position of patterns. Such a detector is, in particular, a semiconductor detector, preferably a CCD camera. With such a detector it is possible to detect the position of the position marking 200 or 210 within an aperture region of the light conductor and thus also to detect the relative position of the ends 162 and 182 arranged stationarily in the tool 14 in relation to the position markings 200 or 210. This means that an exact positioning of the entire tool 14 relative to the position markings 200 and 210 provided for each light conductor is possible, wherein corresponding position markings are also provided on the working surface 16 for the light conductors 170 and 190.

Figure 7:
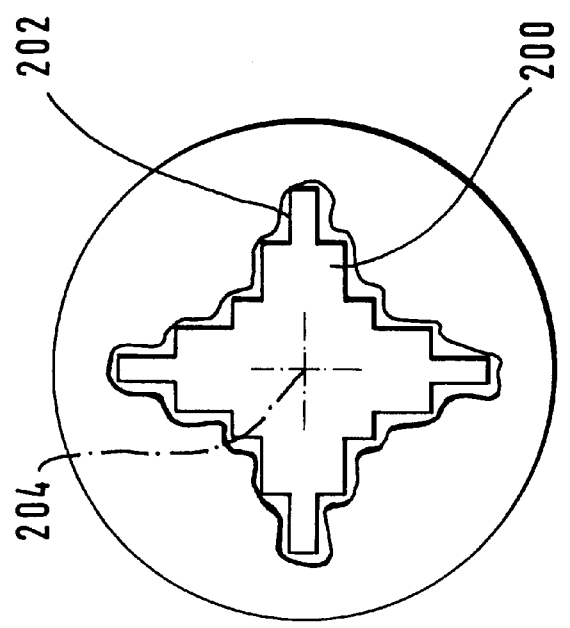
FIG. 7 shows a plan view of an inventive position marking.

The position markings 200 and 210 can be simple, for example, circular or square or rectangular markings. It is, however, particularly advantageous when the position markings, as illustrated in FIG. 7, have an outer contour 202 with cross-like and step-like edges. This creates the possibility of exactly detecting the position of the position marking 200 in the respective CCD camera, for example the CCD camera 168, also in relation to a rotation of the marking about a central axis 204.

If a distance measurement, in particular a measurement of the distance of the operating tip 60 from the working surface 16, is desired in addition to the position detection, a further, advantageous solution of the inventive tool 14 provides, in addition, for a supplementary distance measuring module 220 (FIG. 8) which has flat material elements 222, 224 and 226 forming a housing 221 (FIG. 9). The flat material elements 222 are, in principle, designed like the flat material element 102 but they have only one channel 230. In the same way, the flat material element 224 is designed in a similar manner to the flat material element 104 and likewise has a channel 232 so that it is possible, as illustrated in FIG. 8, to provide an additional light conductor 240 on the tool 14 and hold this in the receiving means formed by the channels 230 and 232. The light conductor 240 is likewise located with an end 242 in the area of the operating tip 60, preferably a front narrow side 228 of the flat material element 222 (FIG. 10).

Figure 11:
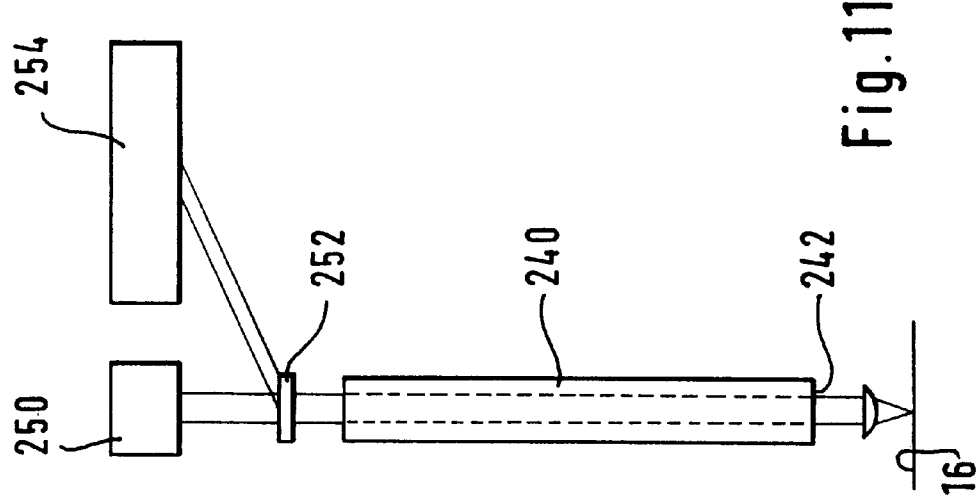

As illustrated in FIG. 11, light which exits from the end 242 is coupled into the light conductor 240 through a light-emitting diode 250, hits the tool or the working surface 16, is reflected by this and coupled out of the light conductor 240 by means of a beam divider 252 and guided to a detector 254 which, on account of the reflected light, is in a position to determine a distance between the front end 242 of the light conductor 240 and the working surface 16.

What is claimed is:

1. A micromechanical tool, comprising:
   at least one functional module for positioning a first end of a light conductor with respect to an object, wherein:
   said functional module has a housing for receiving said light conductor in a section adjacent said first end, and
   said housing is constructed as a layer package comprising at least one structured flat material element forming at least one layer of said package.

2. A micromechanical tool as defined in claim 1, wherein:
   said section of said light conductor is received in a channel within said housing, and
   said channel extends in said at least one structured flat material element.

3. A micromechanical tool as defined in claim 2, wherein:
   said section of said light conductor is received in a channel within said housing, and
   said channel extends between two of said structured flat material elements.

4. A micromechanical tool as defined in claim 3, wherein:
   the flat material element being provided with the channel is located between flat material elements covering said channel.

5. A micromechanical tool as defined in claim 3, wherein:
   said channel is formed by two flat material elements,
   each of said elements has a passage, and
   the two passages overlap one another in sections.

6. A micromechanical tool as defined in claim 5, wherein:
   the passages overlap in an area located close to an inner end, and extend in different directions proceeding from this area.

7. A micromechanical tool as defined in claim 2, wherein:
   the housing has an operating tip adapted to a workpiece, and said channel extends into said operating tip.

8. A micromechanical tool as defined in claim 7, wherein:
   the operating tip has a dimension on the order of magnitude of a dimension of the workpiece.

9. A micromechanical tool as defined in claim 2, wherein:
   said channel is formed by a recess penetrating the respective flat material element.

10. A micromechanical tool as defined in claim 9, wherein:
    said recess has an open end in a region of a narrow side of the flat material element, and a closed end located in an interior of the flat material element.

11. A micromechanical tool as defined in claim 2, wherein:
    an access opening to said channel is provided in a flat material element covering said channel.

12. A micromechanical tool as defined in claim 1, wherein:, each flat material element is structured such that it forms an integrally coherent part.

13. A micromechanical tool as defined in claim 1, wherein:
    the flat material elements are structured exclusively by means of edge surfaces extending over a thickness of the flat material.

14. A micromechanical tool as defined in claim 1, wherein:

the flat material elements are provided with aligning elements.

15. A micromechanical tool as defined in claim 14, wherein:

the aligning elements comprise recesses.

16. A micromechanical tool as defined in claim 15, wherein:

the flat material elements are adapted to be positioned relative to one another by aligning rods engaging in a form-locking manner in the recesses.

17. A micromechanical tool as defined in claim 14, wherein:

the aligning elements of all the flat material elements are arranged so as to be aligned with one another in a direction extending transversely to the flat material elements.

18. A micromechanical tool as defined in claim 1, wherein:

the flat material elements of a functional module are joined to one another.

19. A micromechanical tool as defined in claim 1, wherein:

all the flat material elements of a functional module are produced from a flat material of the same thickness.

20. A micromechanical tool as defined in claim 1, wherein:

the flat material elements are cut out from a piece of flat material.

21. A micromechanical tool, comprising:

at least one functional module, wherein:
said module has a housing constructed as a layer package comprising structured flat material elements forming several layers of said layer package,
said housing forms a channel extending in at least one of said structured flat material elements and being covered by at least another of said structured flat material elements, and
said channel has an opening in a region of a narrow side of said at least one flat material element directed towards a workpiece.

22. A micromechanical tool according to claim 21, wherein:

said channel is connected to one of a source and a drain for a medium and operating as a guiding means for said medium with respect to said workpiece.

23. A micromechanical tool as defined in claim 21, wherein:

each flat material element is structured such that it forms an integrally coherent part.

24. A micromechanical tool as defined in claim 21, wherein:

the housing has an operating tip adapted to a workpiece, and
said opening of said channel is arranged in said tip.

25. A micromechanical tool as defined in claim 24, wherein:

the operating tip has a dimension on the order of magnitude of a dimension of said workpiece.

26. A micromechanical tool as defined in claim 21, wherein:

the functional module is a handling module for a workpiece.

27. A micromechanical tool, comprising:

at least one position detection module, wherein:
said position detection module has a housing constructed as a layer package comprising at least one structured, flat material element forming at least one layer of said layer package,
said housing forms a channel extending in said at least one structured flat material element and being covered by at least another element of said housing,
said position detection module comprises a light conductor having a first end for detecting a marking and a second end coupled to an optical detector, and
said light conductor is received by said channel in said housing with a portion adjacent said first end.

28. A positioning system for the alignment of a micromechanical tool relative to an object, comprising:

at least one marking that is stationary with respect to an object, and
at least one position detection module, wherein:
said position detection module has a housing for a first end of a light conductor detecting one of the at least one markings, a second end of said light conductor being guided to an optical detector, and
said housing is constructed as a layer package comprising at least one structured flat material element forming at least one layer of said layer package.

29. A positioning system for the alignment of tools relative to an object, comprising:

two markings arranged at a distance from one another and stationary with respect to the object; and
at least two position detection modules on a tool side; wherein:
each position detection module has a first end of a light conductor detecting one of the markings, a second end of said light conductor being guided to an optical detector; and
each position detection module is constructed as a layer package comprising at least one structured flat material element forming at least one layer of the layer package.

30. A positioning system for the alignment of tools relative to an object, comprising:

two markings arranged at a distance from one another and stationary with respect to the object; and
at least two position detection modules; wherein:
each position detection module has a housing for a first end of a light conductor detecting one of the markings, a second end of said light conductor being guided to an optical detector; and
said first ends are positioned in such a distance that each light conductor detects one of the markings, and said distance is defined by a central module between said housings.

31. A micromechanical tool, comprising:

at least one function module, wherein:
said function module is a machining module, and
said function module has a housing constructed as a layer package comprising structured, flat material elements forming several layers of the layer package.

\* \* \* \* \*

UNITED STATES PATENT AND TRADEMARK OFFICE
CERTIFICATE OF CORRECTION

PATENT NO. : 6,080,957
DATED : June 27, 2000
INVENTOR(S) : Menschig, et al.

It is certified that error appears in the above-identified patent and that said Letters Patent is hereby corrected as shown below:

On the title page item [75], ABSTRACT should read as follows:

Line 5, change the second occurrence of the word "embodiment" to -- module -- .

Line 7, change the word "function" to -- functional -- .

Signed and Sealed this

Seventeenth Day of April, 2001

Attest:

NICHOLAS P. GODICI

Attesting Officer     Acting Director of the United States Patent and Trademark Office